Patented Feb. 7, 1939

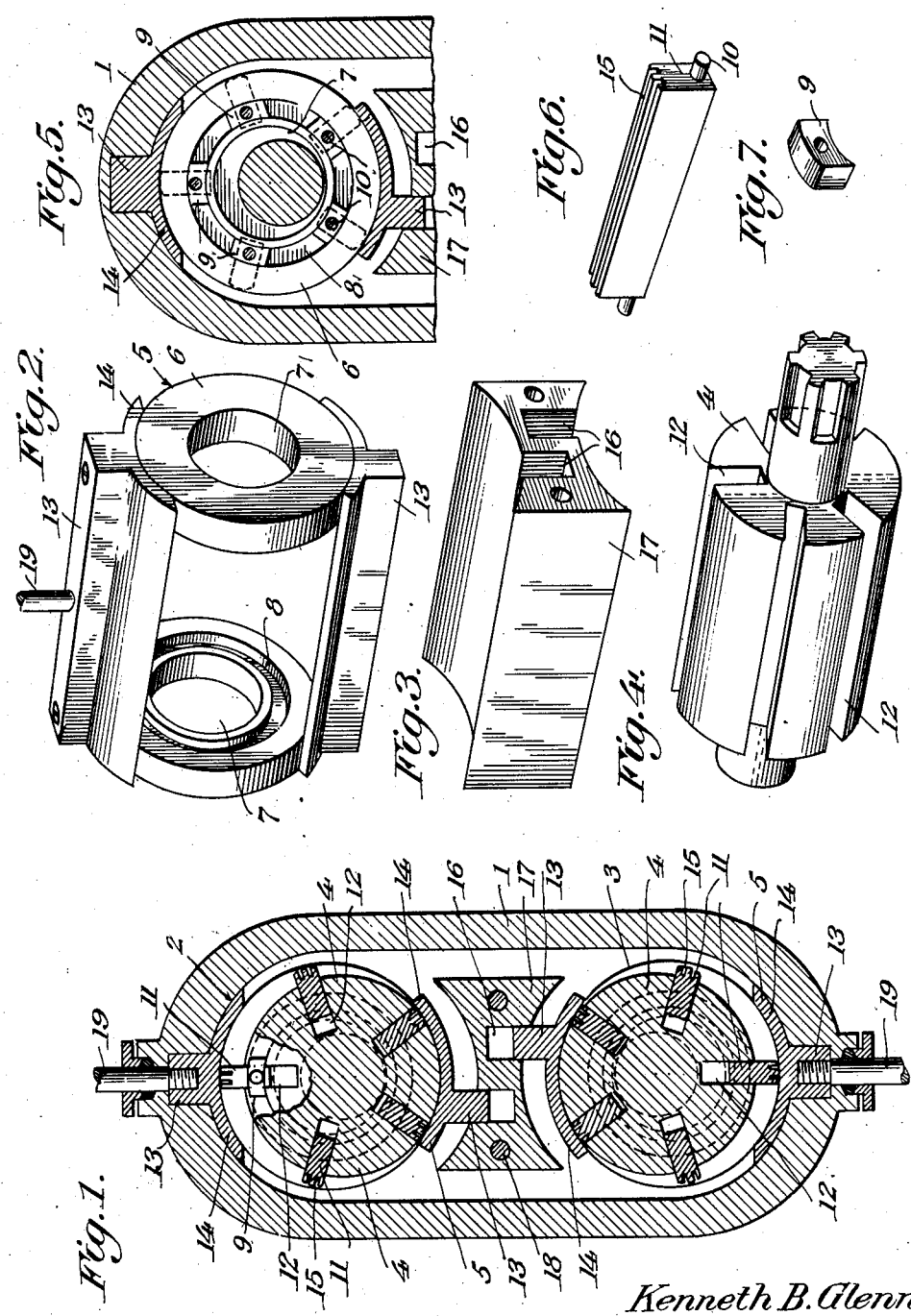

2,145,872

UNITED STATES PATENT OFFICE 2,145,872

CAGE FOR HYDRAULIC TRANSMISSION

Kenneth B. Glenn, New Brighton, Pa.

Application October 29, 1936, Serial No. 108,267

1 Claim. (Cl. 60—53)

This invention relates to hydraulic transmissions of the character set forth in my copending application filed September 22, 1936, and Serial No. 102,013, and more particularly to an improved form of rotor cage for the pump and motor units and means for slidably supporting the cages in the housing of the transmission.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a transverse sectional view showing the improved cages in operative position within the hydraulic transmission housing and having associated therewith the rotors.

Figure 2 is a perspective view illustrating the cage.

Figure 3 is a perspective view showing a guide member for the cages.

Figure 4 is a perspective view of one of the rotors.

Figure 5 is a fragmentary transverse sectional view showing the connection between the blades of the rotor and the cage.

Figure 6 is a perspective view illustrating one of the blades.

Figure 7 is a perspective view illustrating a shoe employed for connecting the blades of the rotor to the cage.

Referring in detail to the drawing, the numeral 1 indicates a housing of a hydraulic transmission which forms the subject matter of the application heretofore referred to. In this housing is located a fluid and also operating therein a pump unit 2 and a motor unit 3. The pump unit may be driven by a power source (not shown). The units 2 and 3 each include a rotor 4 and a cage 5, the latter being mounted for sliding movement in the housing to occupy positions concentric and eccentric to the rotor. The cage 5 consists of circular shaped end plates 6 provided with centrally arranged openings 7 through which the rotor extends. Opposing faces of the end plates have formed therein annular grooves 8 to receive arcuately curved shoes 9 journaled on pintles 10 carried by the ends of blades 11. The blades 11 are slidably mounted in grooves 12 formed in the rotor. The end plates 6 are detachably connected by substantially opposed members 13 each including arcuately curved portions 14 to be contacted by the blades. The contacting edges of the blades are curved to adjust themselves to the contour of the portions 14 and also are provided with grooves 15 to receive the liquid and thereby establish a seal between the blades and the portions 14 of the members 13. One of the members 13 is positioned slightly laterally of the other member so that when cages of the character described are assembled in the housing 1, one member 13 of each cage will be received in guide grooves 16 of a guide member 17. The guide grooves 16 cooperate with guide grooves formed in the housing which receive the other members 13 of said cages in slidably supporting the cages for movements towards and from each other. The guide member 17 is arranged between the cages, as shown in Figure 1, and is supported to the housing 1 by bars 18. One member 13 of each cage has secured thereto an operating rod 19, the latter extending through a stuffing gland provided on the housing 1. The sliding movement of the cages is imparted to the blades 11 of the rotor due to the shoes 9 of the blades fitting in the grooves 8 of said cages.

The operation of this invention is in accordance with that set forth in the co-pending application wherein the rotation of the pump unit circulates the liquid in the housing and which liquid acts on the motor unit to rotate the latter. The motor unit acts to drive any device (not shown) which may be connected to the shaft of the rotor thereof. The cages in the position shown in Figure 1 are adjusted to bring about the operation or drive of the motor unit in a reverse direction to the direction of rotation of the pump unit, thereby providing reverse speed to the transmission. In this position, the pump fluid is circulated above the axes of both the drive and driven motors. By adjusting the cage of the motor unit to its lowermost position opposite to that illustrated in Figure 1, the motor unit will be driven by the pump unit in the same direction as the direction of rotation of said pump unit, thereby providing forward speed to the transmission, the pump fluid, in this instance, being circulated below the axis of the driven rotor and above the axis of the drive rotor. Adjustment of the cage of the pump unit relative to the rotor thereof so that said cage is substantially concentric with the rotor will circulate liquid about the rotor of the pump unit only, thereby permitting the motor unit to remain idle which provides a neutral position to the transmission. To provide variable speeds to the transmission, the eccentricities of the cage of the pump are varied with respect to the rotor thereof so that variable amounts of liquid may circulate around the pump unit and thereby vary the force of the liquid acting on the motor unit, consequently driving the motor unit at slower rates of speed than the speed of rotation of the pump unit.

Having described the invention, I claim:

A hydraulic transmission comprising pump and motor rotors, a housing for said rotors, cages in said housing for said rotors and movable relative thereto and each including end plates detachably connected by substantially opposed members provided with arcuately curved portions to be contacted by blades of the rotors, members formed on said cages, said housing having guide grooves to receive certain of said members of said cages, and a guide member arranged between said cages and having guide grooves arranged laterally of each other to receive the other members of said cages and carried by the housing.

KENNETH B. GLENN.